United States Patent
Li et al.

(10) Patent No.: US 10,626,049 B1
(45) Date of Patent: Apr. 21, 2020

(54) POLYCARBOXYLATE-BASED SUPERPLASTICIZER COMPOSITIONS AND METHODS OF USE

(71) Applicant: GEO Specialty Chemicals, Inc., Ambler, PA (US)

(72) Inventors: Jiang Li, Houston, TX (US); Lanny Clement, Seabrook, TX (US); Dawn Elko, Flemington, NJ (US); Timothy Hegge, Lansdale, PA (US); Arpad Savoly, Martinsville, NJ (US)

(73) Assignee: GEO Specialty Chemicals, Inc., Ambler, PA (US)

( * ) Notice: Subject to any disclaimer, the term of this patent is extended or adjusted under 35 U.S.C. 154(b) by 276 days.

(21) Appl. No.: 15/936,775

(22) Filed: Mar. 27, 2018

Related U.S. Application Data

(60) Provisional application No. 62/486,736, filed on Apr. 18, 2017.

(51) Int. Cl.
*C04B 7/00* (2006.01)
*C04B 24/04* (2006.01)
*C04B 24/02* (2006.01)
*C04B 24/00* (2006.01)
C04B 7/34 (2006.01)
C04B 28/00 (2006.01)
C04B 32/00 (2006.01)
C04B 14/48 (2006.01)
C04B 16/00 (2006.01)
C04B 22/04 (2006.01)
C04B 28/14 (2006.01)

(52) U.S. Cl.
CPC ............ *C04B 24/04* (2013.01); *C04B 24/005* (2013.01); *C04B 24/02* (2013.01); C04B 28/14 (2013.01)

(58) Field of Classification Search
USPC .......................................... 106/638, 641, 642
See application file for complete search history.

(56) References Cited

FOREIGN PATENT DOCUMENTS

| | | | | |
|---|---|---|---|---|
| CN | 103664090 A | * | 3/2014 | |
| CN | 104108898 A | * | 10/2014 | |
| CN | 104628961 A | * | 5/2015 | ............ C08F 265/00 |
| CN | 104710145 A | * | 6/2015 | |
| CN | 104946219 A | * | 9/2015 | |
| GB | 705102 A | * | 3/1954 | ............ C04B 35/66 |

* cited by examiner

Primary Examiner — James E McDonough
(74) Attorney, Agent, or Firm — Rankin, Hill & Clark LLP

(57) ABSTRACT

A dispersant composition for use in gypsum and/or cementitious compositions that includes, in combination, a polycarboxylate-based superplasticizer and a synergistically effective amount of an aluminum salt. The presence of the aluminum salt, such as aluminum chlorohydrate, improves the performance of the polycarboxylate-based superplasticizer.

7 Claims, 6 Drawing Sheets

POLYCARBOXYLATE-BASED SUPERPLASTICIZER COMPOSITIONS AND METHODS OF USE

CROSS-REFERENCE TO RELATED APPLICATIONS

This application claims priority to U.S. Provisional Pat. App. Ser. No. 62/486,736, filed Apr. 18, 2017.

BACKGROUND OF INVENTION

Field of Invention

The present invention relates to polycarboxylate-based superplasticizer compositions and, more particularly, to the use of aluminum salts to achieve a booster effect in polycarboxylate-based superplasticizer compositions.

Brief Description of Related Art

The attached article entitled "Superplasticizer" obtained from Wikipedia is hereby incorporated by reference as if fully rewritten herein. The article provides a general description of polycarboxylate-based superplasticizer compounds and their use as dispersants. Throughout this specification and in the appended claims, the term "polycarboxylate-based superplasticizers" refers to compounds of this type. Polycarboxylate-based superplasticizers are used, for example, in the production of gypsum-based wallboard and in cementitious compositions (e.g., mortar and high performance concrete).

BRIEF SUMMARY OF THE INVENTION

Applicant has surprisingly discovered that additions of aluminum salts can significantly boost the dispersing performance of polycarboxylate-based superplasticizers in gypsum wallboard and cementitious applications. A presently preferred aluminum salt for use in the present invention is aluminum chlorohydrate, which produces a significant booster effect on a variety of polycarboxylate-based superplasticizers at relatively low loadings. Surprisingly, the use of aluminum chlorhydrate and other metal salts does not provide the same booster effect when used with other classes of dispersant compositions including, for example, naphthalene-based dispersants. Furthermore, salts of metals other than aluminum did not show similar booster effects when used with polycarboxylate-based superplasticizers.

The foregoing and other features of the invention are hereinafter more fully described below, the following description setting forth in detail certain illustrative embodiments of the invention, these being indicative, however, of but a few of the various ways in which the principles of the present invention may be employed.

BRIEF DESCRIPTION OF THE DRAWINGS

With reference to the accompanying drawing figures, please note that.

DETAILED DESCRIPTION OF THE INVENTION

Applicant has discovered that aluminum salts, and aluminum chlorohydrate in particular, provide a surprising booster effect when used together with polycarboxylate-based superplasticizer compounds. The amount of aluminum salts used can be very low (e.g., 1%) to achieve the booster effect. But loadings as high as 200% (active on active) based on the polycarboxylate-based superplasticizer quantity can also be used. One having skill in the art can appreciate that the particular loading for a particular application can be determined using routine experimentation. It appears that a loading range of from about 3% to about 10% (with respect to the weight of the polycarboxylate-based superplasticizer) is most practical.

Applicant does not presently know why aluminum salts provide the significant booster effect when used in combination with polycarboxylate-based superplasticizer compounds. The effect does not occur in other classes of dispersants such as, for example, naphthalene sulfonate compounds. Furthermore, other metal salts (e.g., $FeCl_3$ and $FeSO_4$) do not provide the booster effect when used in combination with polycarboxylate-based superplasticizer compounds.

Applicant has confirmed that aluminum chlorohydrate provides the booster effect. Applicant suspects that other aluminum salts such as aluminum sulfate, would also provide the intended effect because the aluminum salt is dissolved in water before use. Since the aluminum salts are dissolved in water at the time of use, the grade or particle size of the aluminum salt is not of particular concern.

The booster effect is obtained using both synthetic and natural gypsum. Furthermore, the booster effect is also obtained in cementitious compositions.

Examples 1-8

In Examples 1-8, calcined gypsum was mixed with the ingredients specified to approximate a gypsum wallboard slurry that would produce wallboard at 1600 lb/MSF (pounds per thousand square feet) with a water to stucco ratio of 0.8. Dispersants were dosed at levels ("as is" basis) shown on the X-axis of the graphs in the referenced drawing figures. In order to handle various additives more accurately, a solution containing a dispersant and a "booster" candidate was prepared by diluting them to the concentrations shown on the graphs. First, about 50 g of calcined gypsum was weighed into a paper cup. The calculated amount of the dilute solution was weighed in a separate paper cup. Deionized water was added to make the total water solution to be about 40 g. The calcined gypsum was added slowly to the water solution while stirring with a spatula over 30 seconds. The mixture was then poured onto a clean glass surface from height of about 1.5 inches. The circular gypsum patty was allowed to set, and a measurement of the average slump diameter was obtained.

Example 1

Figure 1:
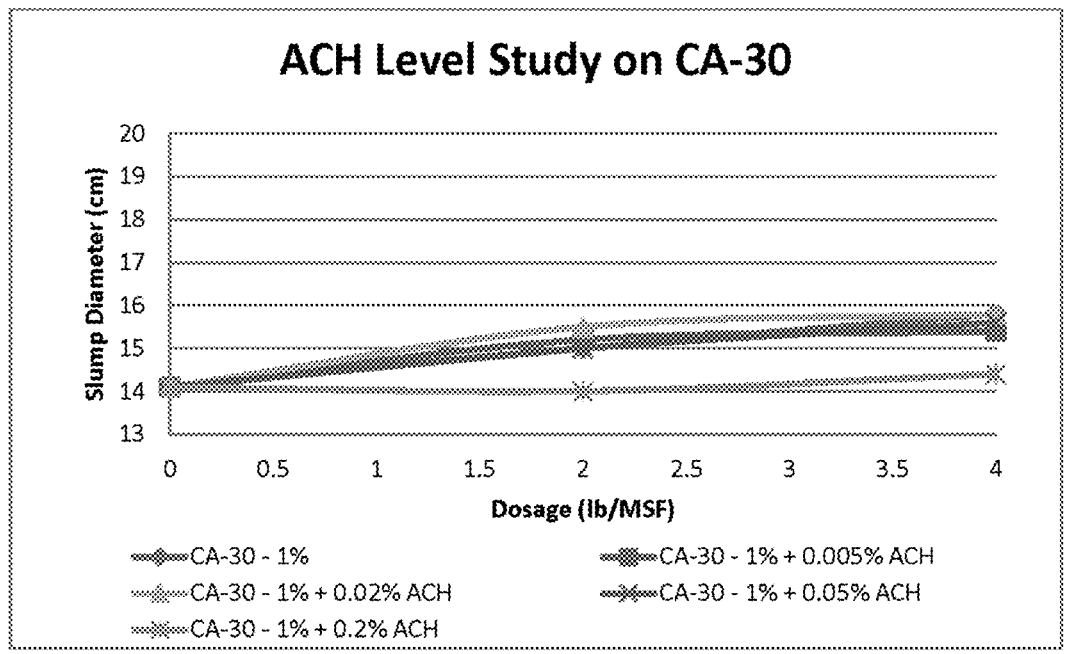
FIG. 1 is a graph showing slump diameter as a function of aluminum chlorohydrate loading together with a polynaphthalene sulfonate calcium salt dispersant in gypsum.

FIG. 1, which is a graph showing slump diameter as a function of aluminum chlorohydrate loading together with a polynaphthalene sulfonate calcium salt dispersant in gypsum, shows that aluminum chlorohydrate does not produce a significant booster effect when used in combination a polynaphthalene sulfonate calcium salt dispersant in gypsum. The term "CA-30" in FIG. 1 references DILOFLO CA-30, which is a polynaphthalene sulfonate (calcium salt) available from GEO Specialty Chemicals Inc. of Ambler, Pa.

Examples 2-4

Figure 2:
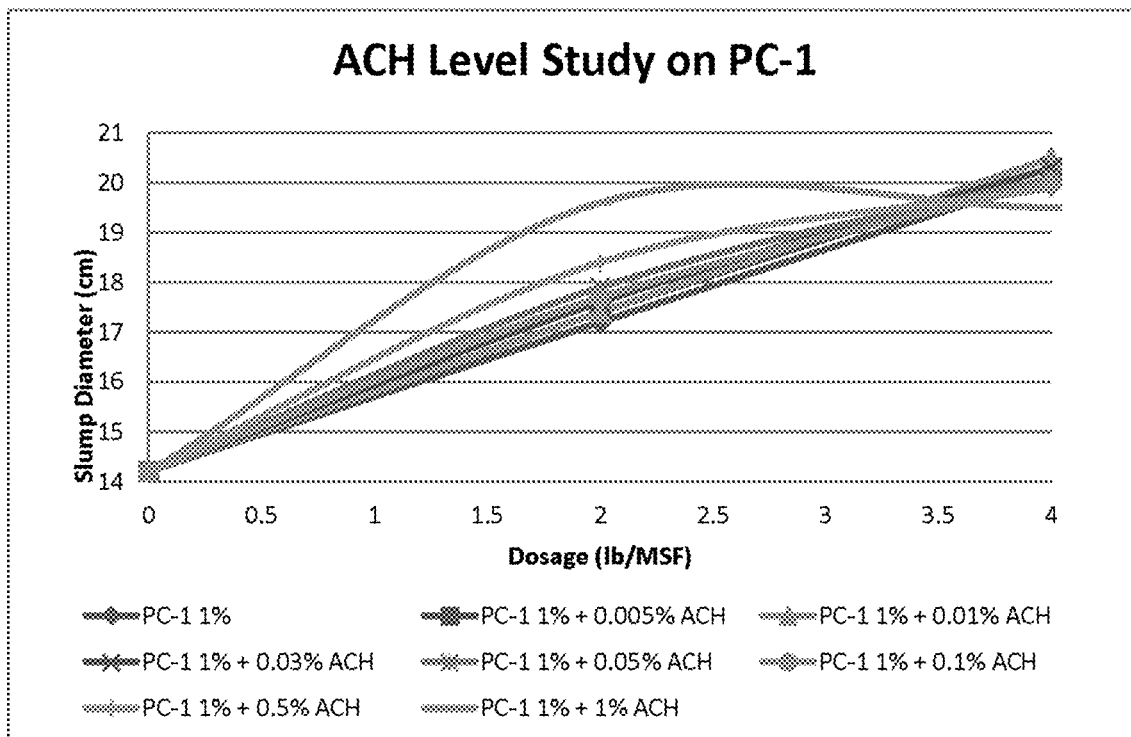
FIG. 2 is a graph showing slump diameter as a function of aluminum chlorohydrate loading together with a commercially available polycarboxylate-based superplasticizer dispersant in gypsum.
Figure 3:
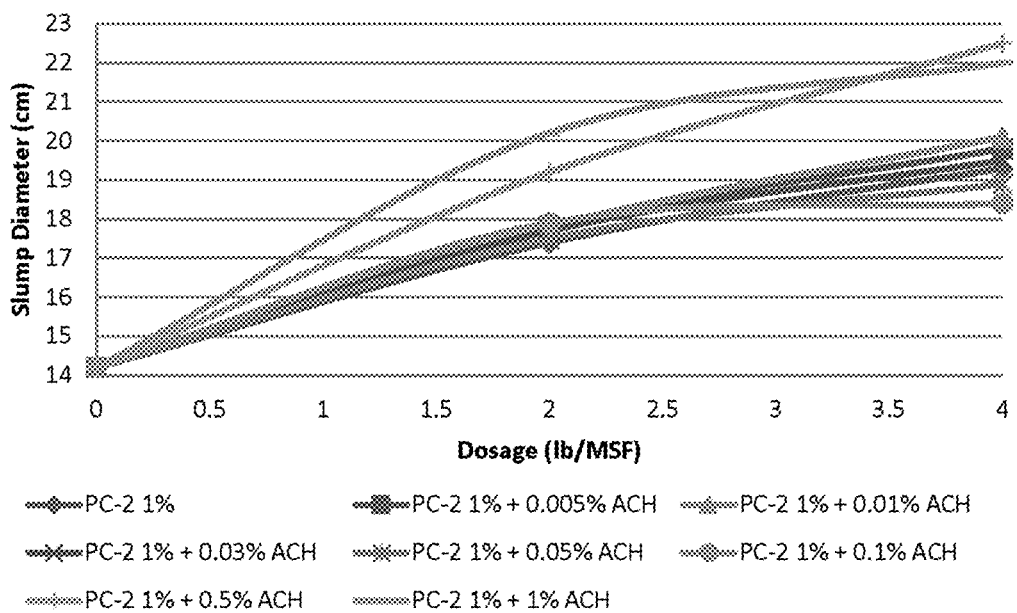
FIG. 3 is a graph showing slump diameter as a function of aluminum chlorohydrate loading together with another commercially available polycarboxylate-based superplasticizer dispersant in gypsum.
Figure 4:
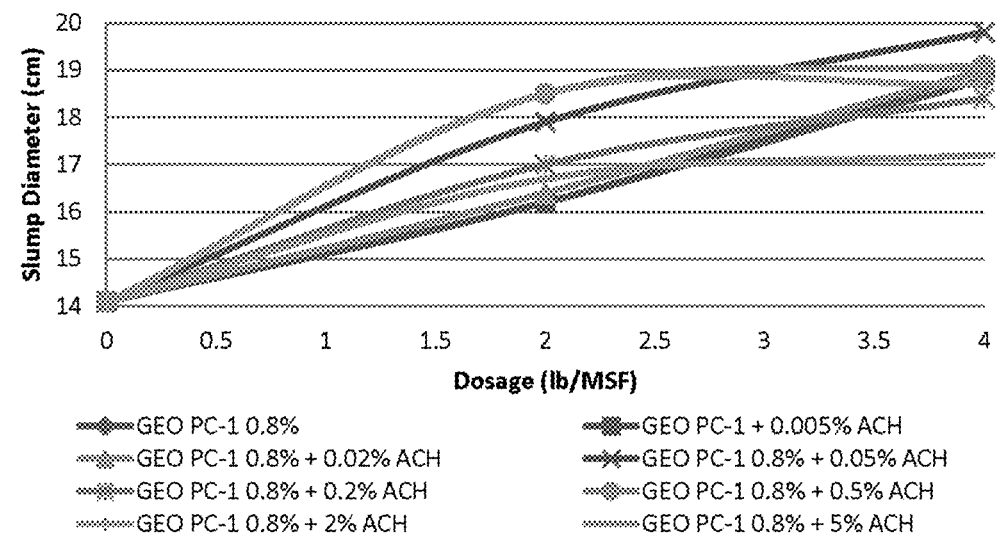
FIG. 4 is a graph showing slump diameter as a function of aluminum chlorohydrate loading together with another polycarboxylate-based superplasticizer dispersant in gypsum.

FIGS. 2, 3 and 4, which are graphs showing slump diameter as a function of aluminum chlorohydrate loading together with three different commercially-available polycarboxylate-based superplasticizers in gypsum, show that the presence of an aluminum salt (aluminum chlorohydrate) produce a significant booster effect in gypsum.

Examples 5 and 6

Figure 5:
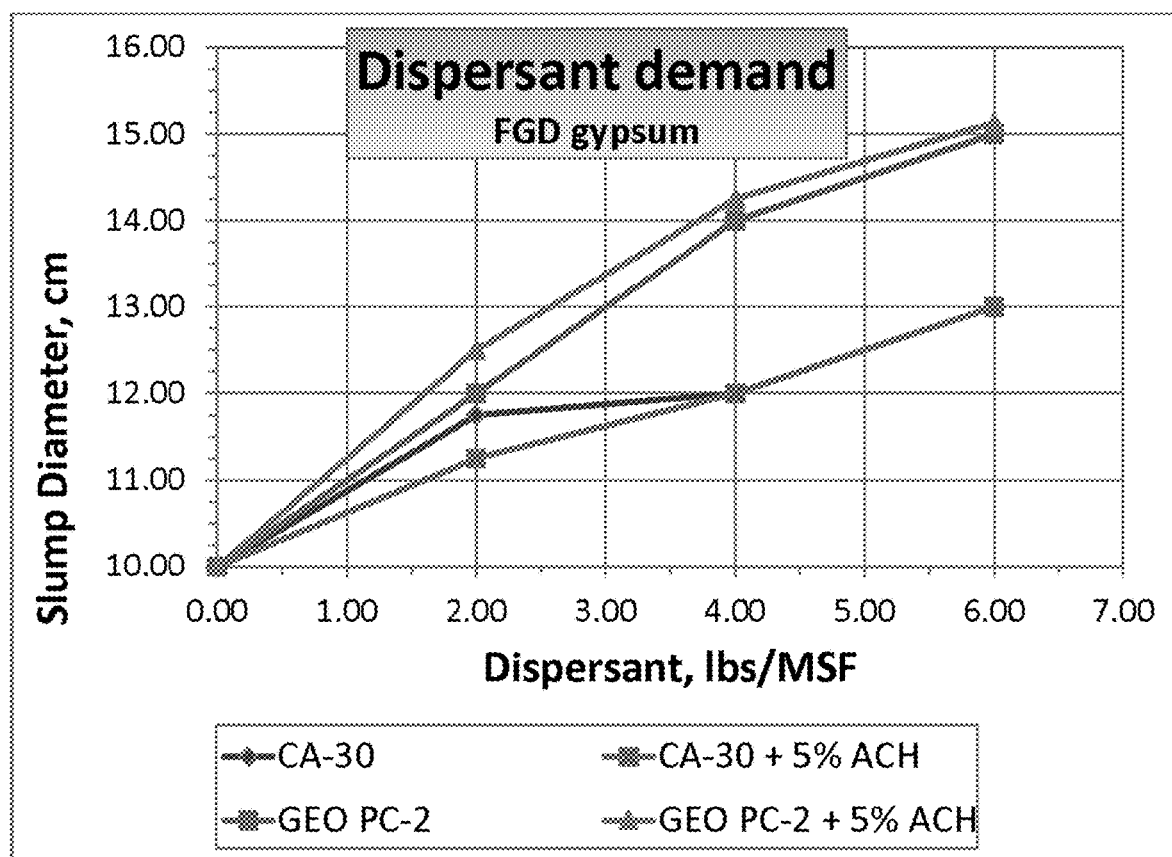
FIG. 5 is a graph showing slump diameter for a two controls and two polycarboxylate-based superplasticizer compositions containing aluminum chloride at different loadings in synthetic gypsum.
Figure 6:
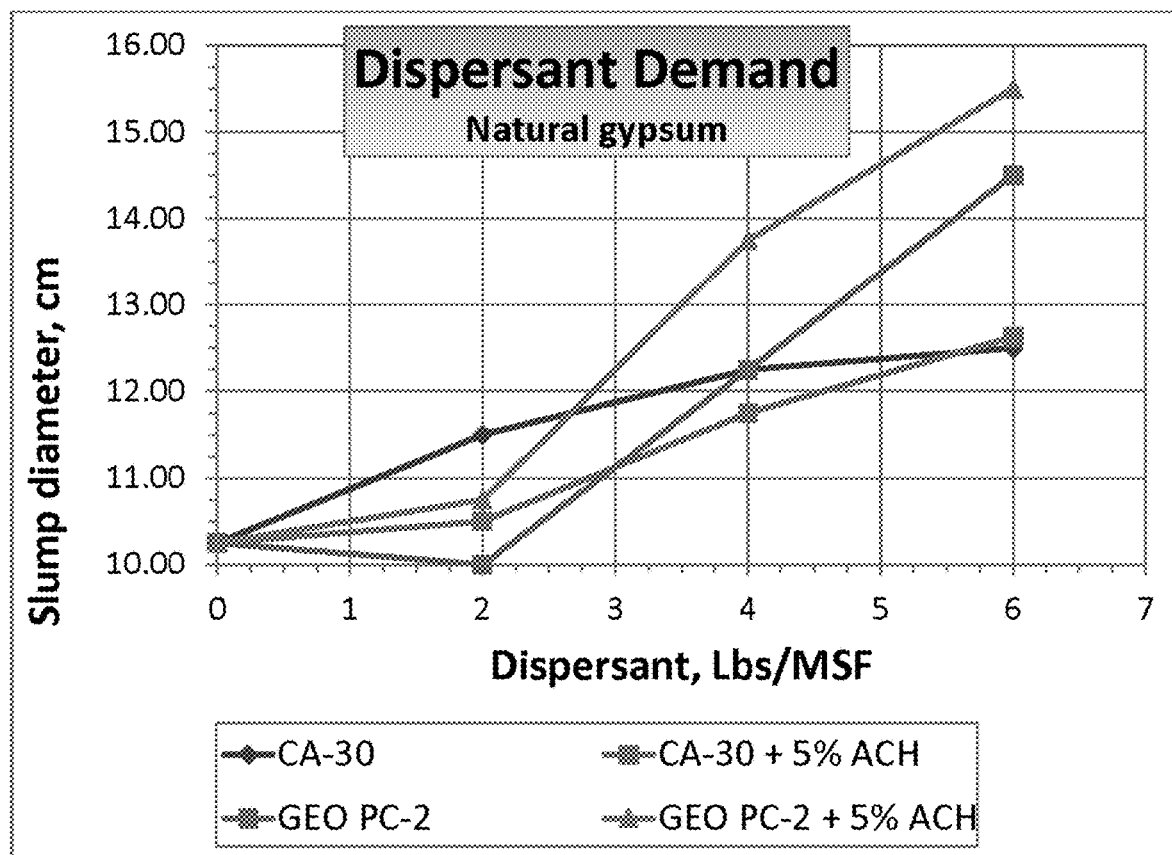
FIG. 6 is a graph showing slump diameter for a two controls and two polycarboxylate-based superplasticizer compositions containing aluminum chloride at different loadings in natural gypsum.

FIGS. 5 and 6 are graphs showing a comparison in slump diameter for synthetic gypsum and natural gypsum, respectfully, when an aluminum salt is and is not used in combination with either a naphthalene salt polymer or a polycarboxylate-based superplasticizer. As noted in the graphs, the presence of the aluminum salt provides a significant improvement in terms of slump diameter for the polycarboxylate-based superplasticizers.

Examples 7 and 8

Figure 7:
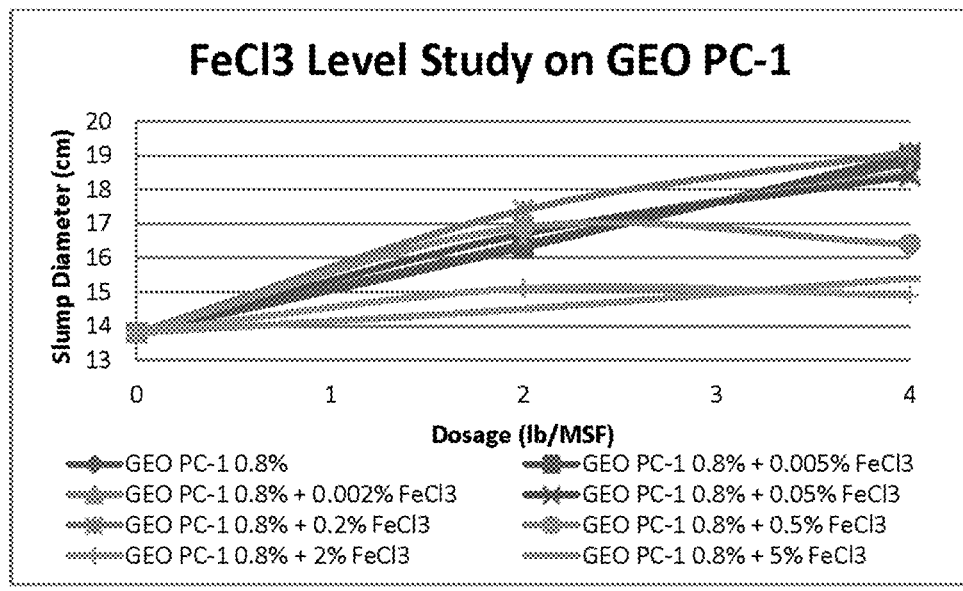
FIG. 7 is a graph showing slump diameter as a function of iron (III) chloride loading together with a polycarboxylate-based superplasticizer dispersant in gypsum.
Figure 8:
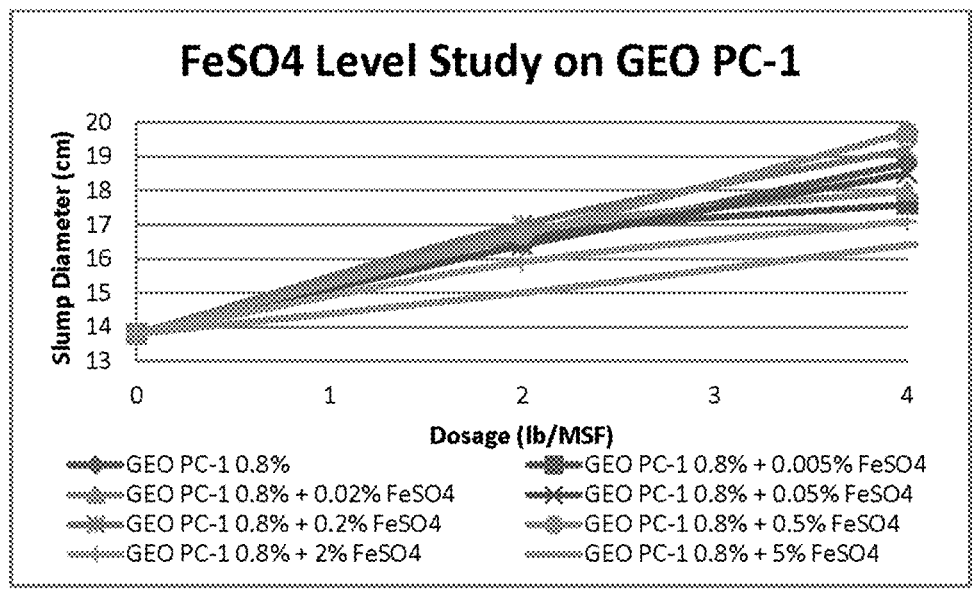
FIG. 8 is a graph showing slump diameter as a function of iron (II) sulfate loading together with a polycarboxylate-based superplasticizer dispersant in gypsum.

FIGS. 7 and 8 are graphs showing that $FeCl_3$ and $FeSO_4$, respectively, do not provide a similar booster effect (as compared to aluminum chlorohydrate—see FIG. 4) when used with a polycarboxylate-based superplasticizer.

Example 9

To determine whether the improvement in dispersant performance would be achieved in cementitious compositions, applicant devised an additional test. 35 g of deionized water was weighed into a beaker (in the tests where a dispersant was used, the amount of water contained in the dispersant was subtracted). 100 g of Portland cement was weighed into another beaker. The dispersant to be used, with or without the "booster" (0.2% active based on cement quantity), was weighed into a beaker. The cement was added to the water and mixed for 30 seconds with a spatula. Then, the pre-weighed dispersant was added to the cement/water slurry and re-mixed for 60 seconds. The slurry was poured into a mini-slump cone on a clean glass surface, and the cone was lifted. The slump diameter was measured over 4 diagonal points and the average was recorded. After 30 min, the slurry was scraped back into the beaker, re-mixed for 30 seconds, and the steps of pouring the slurry/lifting the cone/measuring the slump diameter were repeated. This was continued to cover initial, 30, 60, 90 and 120 minute intervals.

Figure 9:
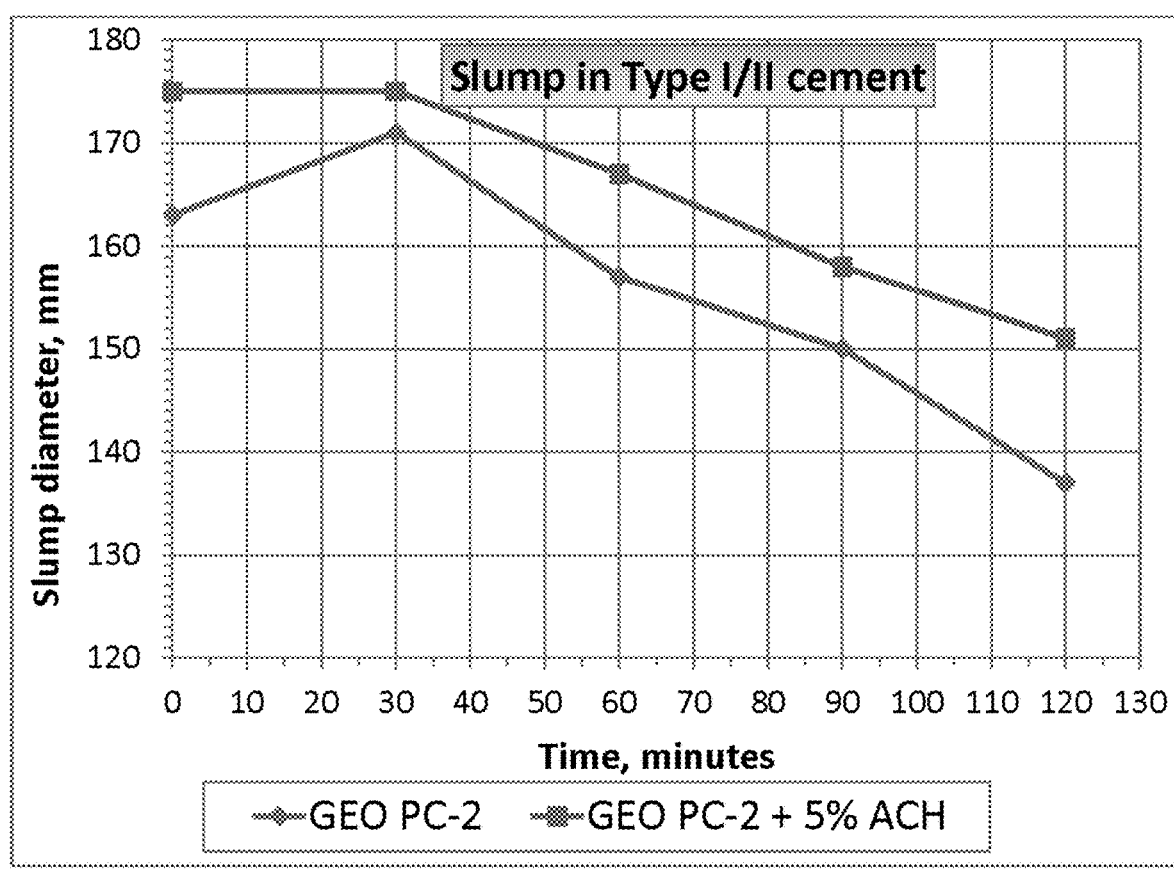
FIG. 9 is a graph showing slump diameter as a function of time for a control and a polycarboxylate-based superplasticizer dispersant in cement.

FIG. 9 is a graph showing slump diameter as a function of time for a control (no aluminum chlorohydrate booster) and a polycarboxylate-based superplasticizer with an aluminum chlorodhydrate booster in cement. The results demonstrate a significant improvement in dispersant performance due to the presence of the aluminum chlorohydrate booster in cement.

Practical Applications

It is likely that in the manufacture of gypsum wallboard, the relative dosage of polycarboxylate-based superplasticizer would be within the range of 1-6 lb/MSF, and the aluminum salt booster would be present in the range of 3-10% (by weight) on the basis of the polycarboxylate-based superplasticizer dosage. And, in cementitious applications, it is likely that the relative dosage of polycarboxylate-based superplasticizer would be within the range of 0.2-0.3% (by weight of the cement), and the aluminum salt booster would be present in the range of 3-10% (by weight) on the basis of the polycarboxylate-based superplasticizer dosage.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method for improving the dispersant performance of a polycarboxylate-based superplasticizer in gypsum comprising combining a synergistically effective amount of an aluminum salt with the polycarboxylate-based superplasticizer.

2. The method according to claim 1, wherein the aluminum salt is aluminum chlorohydrate.

3. A method for improving the dispersant performance of a polycarboxylate-based superplasticizer in cementitious compositions comprising combining a synergistically effective amount of an aluminum salt with the polycarboxylate-based superplasticizer.

4. The method according to claim 3, wherein the aluminum salt is aluminum chlorohydrate.

5. A dispersant composition for use in gypsum and/or cementitious compositions, the dispersant composition consisting of, in combination, a polycarboxylate-based superplasticizer and a synergistically effective amount of an aluminum salt.

6. The dispersant composition according to claim 5, wherein the aluminum salt is aluminum chlorohydrate.

7. A dispersant composition for use in gypsum, the dispersant composition comprising, in combination, a polycarboxylate-based superplasticizer and a synergistically effective amount of an aluminum salt.

* * * * *